Sept. 26, 1933.　　　G. W. SCHUTMAAT　　　1,928,362
TRANSPLANTER
Filed Nov. 28, 1932　　　4 Sheets-Sheet 1
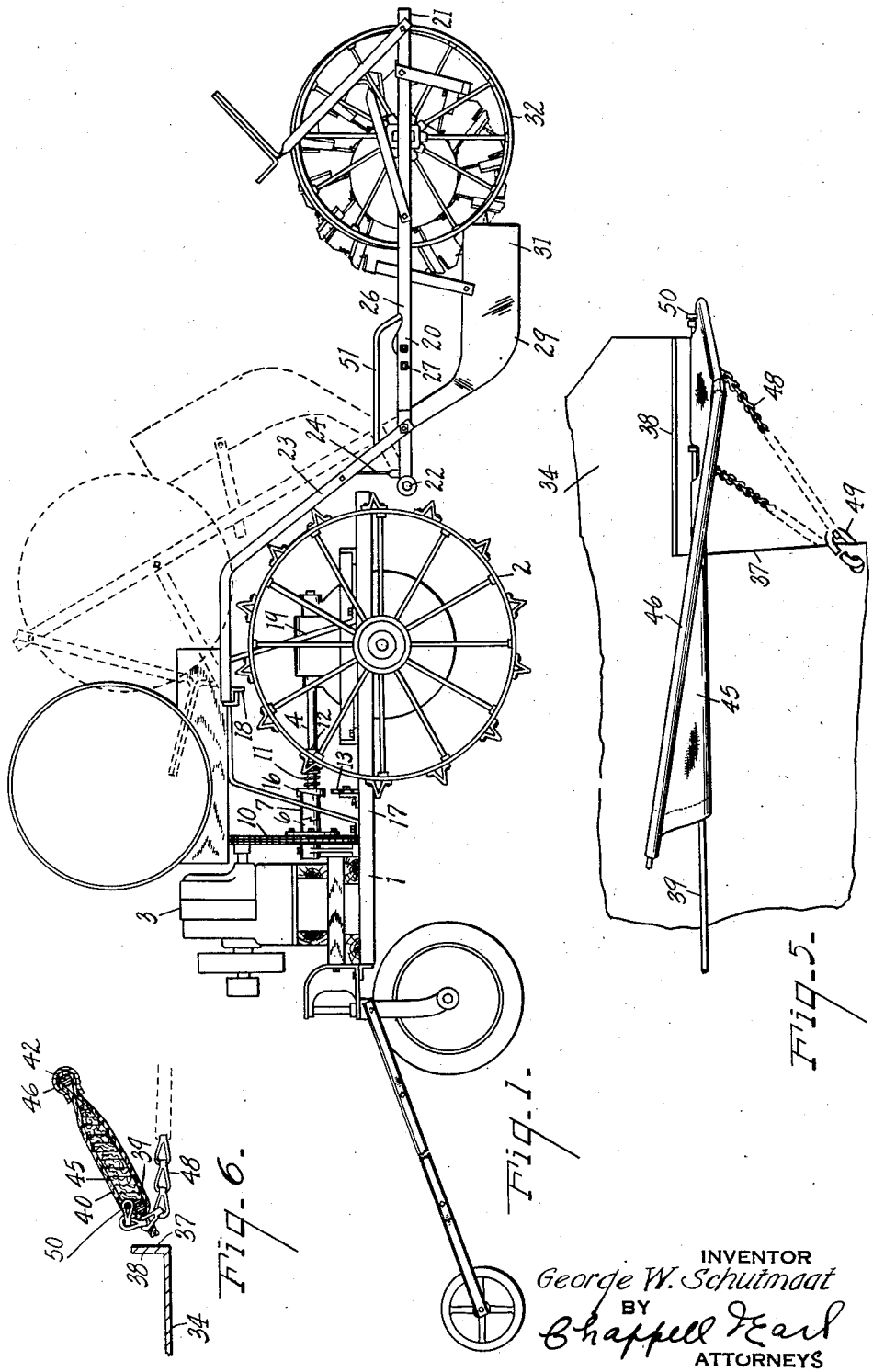
INVENTOR
George W. Schutmaat
BY
Chappell & Earl
ATTORNEYS

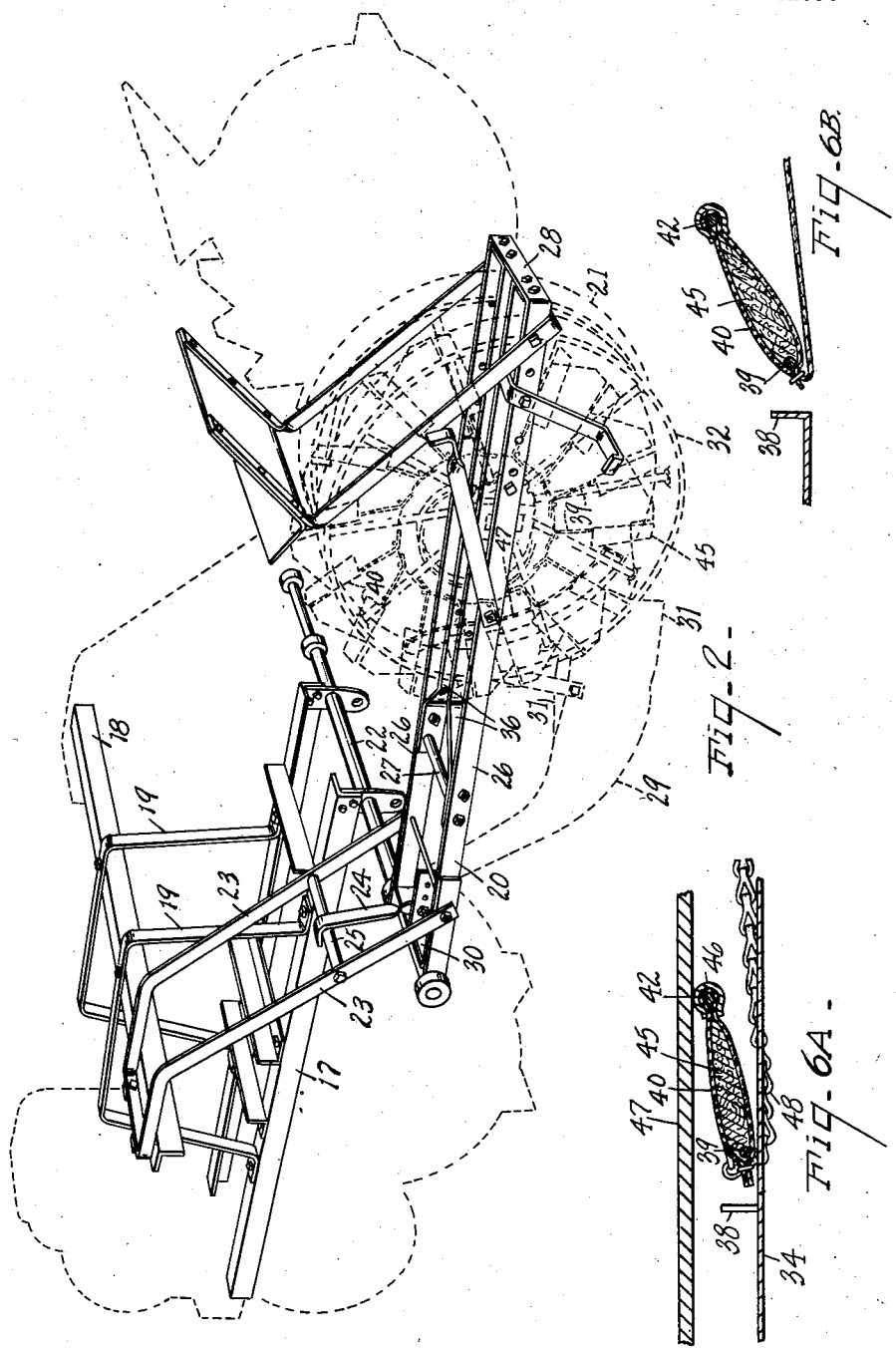

Sept. 26, 1933.  G. W. SCHUTMAAT  1,928,362
TRANSPLANTER
Filed Nov. 28, 1932  4 Sheets-Sheet 3
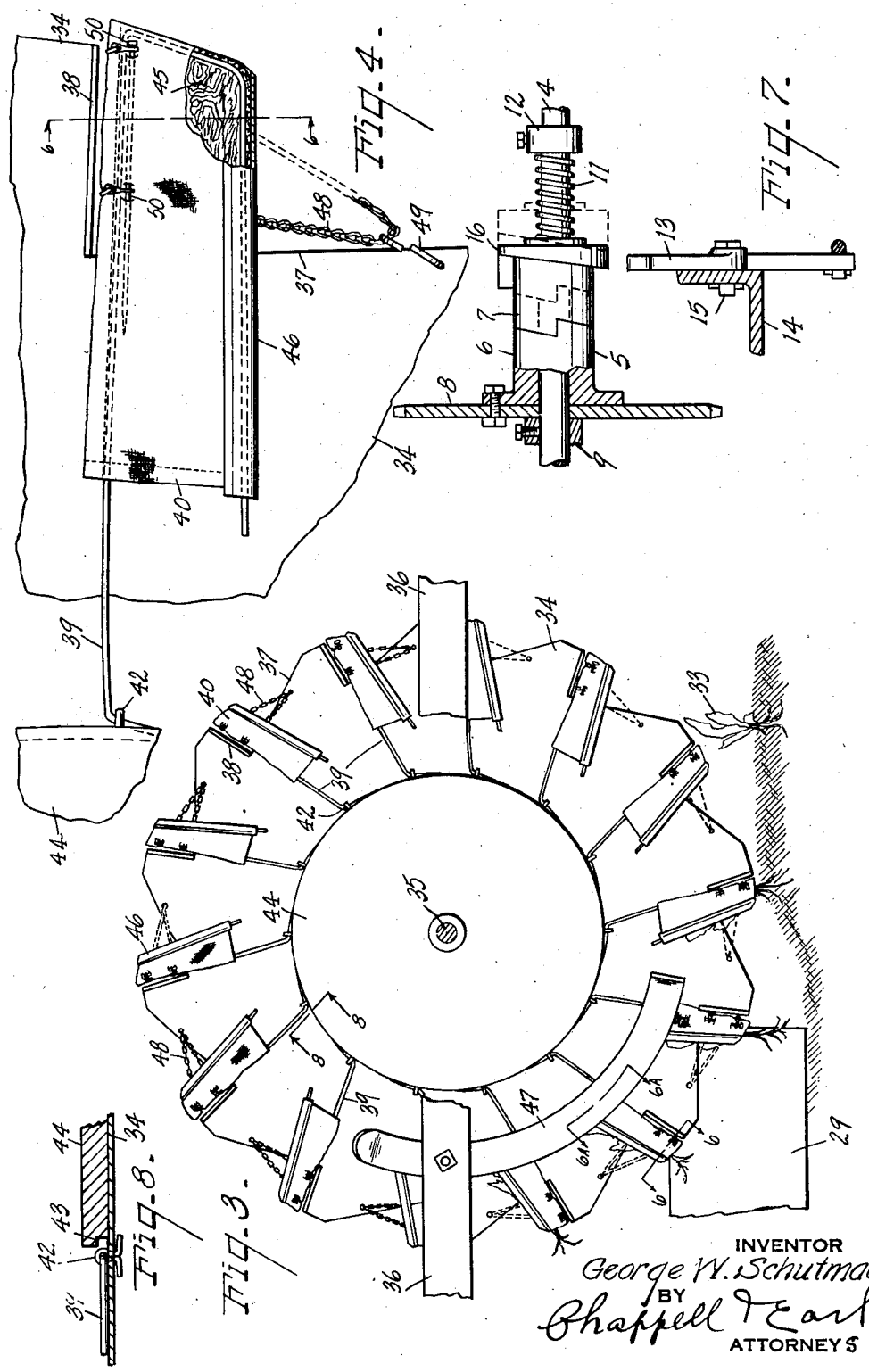
INVENTOR
George W. Schutmaat
BY
Chappell & Earl
ATTORNEYS Sept. 26, 1933.   G. W. SCHUTMAAT   1,928,362
TRANSPLANTER
Filed Nov. 28, 1932   4 Sheets-Sheet 4
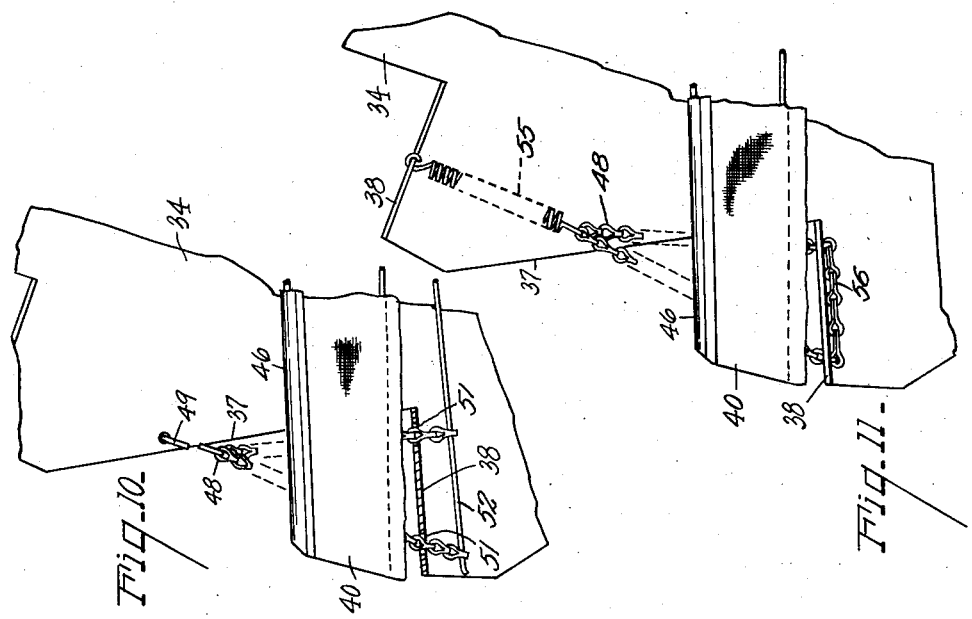
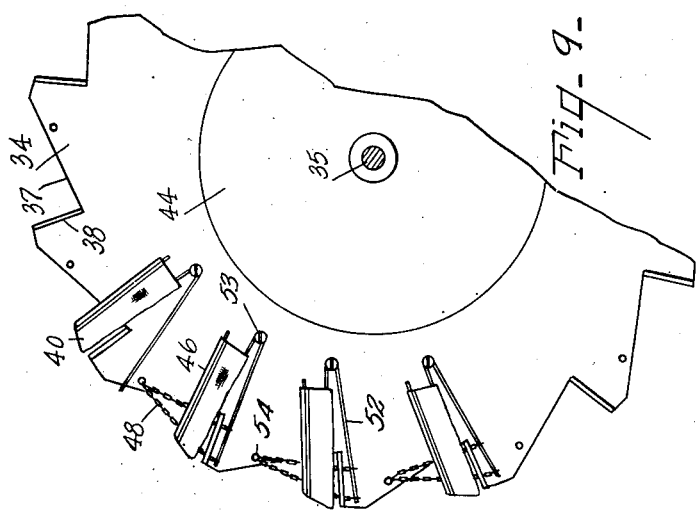
INVENTOR
George W. Schutmaat
BY
ATTORNEYS Patented Sept. 26, 1933

1,928,362

UNITED STATES PATENT OFFICE 1,928,362

TRANSPLANTER

George W. Schutmaat, Hamilton, Mich., assignor to Hamilton Manufacturing Company, Hamilton, Mich.

Application November 28, 1932
Serial No. 644,698

20 Claims. (Cl. 111—3)

The main objects of this invention are:

First, to provide a transplanter which is well adapted for the transplanting of small and delicate plants such as celery, beets and the like, and one which is of large capacity.

Second, to provide in a transplanter an improved plant holder which has a very firm or secure hold upon the plants and at the same time is not likely to injure them.

Third, to provide a plant holder having these advantages from which the plants are effectively discharged.

Objects pertaining to details and economies of my invention will definitely appear from the description to follow. The invention is defined in the claims.

A structure which embodies the features of my invention is clearly illustrated in the accompanying drawings, in which:

Fig. 1 is a view in side elevation of a transplanter embodying the features of my invention, the carrying position of the transplanter relative to the propelling or power unit being illustrated by dotted lines.

Fig. 2 is a fragmentary perspective view showing the frame work of the propelling unit and of one of the transplanting units, the structure illustrated being a double planter, that is, adapted for simultaneously transplanting two rows.

Fig. 3 is an enlarged detail longitudinal section illustrating the operation of the planter.

Fig. 4 is an enlarged fragmentary detail of the carrier, a portion of one of the plant holder pockets being partially broken away and shown in section.

Fig. 5 is a fragmentary perspective view of one of the plant holders.

Fig. 6 is a detail transverse section on line 6—6 of Fig. 4.

Fig. 6A is a detail section on line 6A—6A of Fig. 3.

Fig. 6B is a detail section of a modification.

Fig. 7 is a view mainly in side elevation of the clutch on the drive shaft of the power unit, portions being broken away and shown in vertical section.

Fig. 8 is a detail section on line 8—8 of Fig. 3 showing how the plant holder arm is secured to the side of the carrier.

Fig. 9 is a fragmentary view of a modified form or embodiment of my invention.

Fig. 10 is an enlarged detail view of the structure of Fig. 9.

Fig. 11 shows a further modified construction.

Referring to the drawings, 1 designates a power unit generally having traction wheels 2 driven from the motor 3 through the drive shaft 4 and suitable transmission gearing. The drive shaft is provided with a clutch 5 for connecting it to the motor.

The clutch comprises a driving member 6 connected to the motor through the sprocket chain 10 and the sprocket wheel 8 which is rotatable on the shaft and held in position thereon by means of the collar 9. The driven clutch member 7 is slidably mounted on the shaft 4 to coact with the driving clutch member 6 and is yieldingly urged into engagement therewith by the spring 11 supported by the thrust collar 12 on the shaft.

The driven clutch member is adapted to be moved out of engagement with the driving clutch member and against the force of the spring 11 by the arm 13 pivoted to the frame 14 at 15 and coacting with the cam 16 on the driven clutch member so that to disconnect the clutch the lever 13 is shifted into the path of the cam. Rotation of the shaft will disengage the clutch, thereby relieving the operator of the labor necessary to effect such disengagement, which is considerable when the machine is in operation.

The tractor 1 is provided with a main frame 17 on which is mounted the cross member 18 by means of brackets 19. The frame 20 of the transplanter unit 21 is pivoted to the cross shaft 22 carried by the main frame 17 so that the transplanter unit may be swung upwardly and forwardly to carrying or inoperative position as indicated by the dotted lines of Fig. 1. In such position the frame 20 rests on the cross member 18. A hanger 23 is pivoted to the transplanter frame 20 for coaction with the cross member 18 to steady the transplanter. The hooked arm 24 on the transplanter frame 20 engages the cross piece 25 of the hanger for limiting the movement of the frame 20.

The transplanter unit frame in the embodiment illustrated consists of spaced longitudinal members 26 connected by suitable cross pieces as 27 and 28. The furrow opener 29 is connected at its front end to the bracket 30 and is provided with rearwardly diverging wings 31.

Carrying and press wheels 32 are mounted on the frame with their axles in oppositely inclined relation as shown in Fig. 2. The press wheels are spaced so as to permit the plants as at 33 to pass between them, pressing the earth upon the same as the press wheels move forwardly.

In advance of, but adjacent to, the press wheels

I mount a disk-like carrier 34, the spindle 35 of which is carried by the spaced bars 36. The front ends of these bars are secured to the cross piece 27 and their rear ends to the cross piece 28. The spindle 35 of the carrier is connected to and driven by one of the press wheel spindles so that the carrier is positively rotated at a peripheral speed equal to the speed at which the machine travels over the ground, or somewhat faster.

The carrier has a series of peripheral recesses 37 preferably V-shaped as illustrated, the forward edge of each recess having a lateral flange 38 constituting a plant holder guard. A plant holder is associated with each of these recesses.

The plant holders consist of U-shaped or looped resilient pocket holders 39 formed of round spring material, one arm being longer than the other and secured at its inner end to the carrier disk so that the loop end projects across one of the recesses and lies adjacent the flange at the front edge thereof.

In the embodiment illustrated the pocket holders are secured to the side of the carrier by means of cotter pins 42 as shown in Fig. 8, the holders having laterally projecting ends which engage in the annular recess 43 of the disk-like support 44 on the side of the carrier. This provides a very simple and effective way of securing the pocket holders.

The pocket members 40 are preferably formed of canvas shaped into tubes and sleeved over the loop ends of the pocket holders, the pockets preferably containing a filling 45 of compressible material such as sisal or the like arranged to provide a curved plant engaging face as illustrated in Figs. 6 and 6A. The metal channel-shaped binding 46 is clamped upon the rear edge of the pocket securing it to the holder and also providing a wear plate coacting with the segmental pocket closing cam 47.

The free arm of the pocket holder is offset from the plane of its supporting arm so that the pocket is normally supported at an angle to the plane of the disk, the pocket holder being placed under torsion when the pocket is closed so that the pocket is promptly opened when it passes from the pocket closing cam 47.

Each pocket is provided with a flexible supporting member which coacts therewith in holding the plant. In the embodiment illustrated the supporting member is in the form of a double chain 48, the loop end of which is engaged with a split ring 49 on the rear edge of the recess. The ends of the chain are wrapped around the front edge of the pocket and secured on the side thereof by means of the pin 50. This manner of securing to the pocket is of particular advantage where the face of the pocket is curved as illustrated and results in a slight rolling action of the pocket and the support, tending to carry the plant into the pocket instead of forcing it therefrom.

While I find the small chains suitable for these supports, pieces of canvas or the like are very satisfactory in this relation. In Fig. 6B I illustrate such an embodiment of my improvements. With this arrangement the gripping action on the plant is very secure and at the same time does not crush or injure the same, even when the machine is used for transplanting very delicate plants.

In use the operator, occupying the seat 51, lays the plants 33 into the crotch between the pocket and the flexible plant support. The rotation of the carrier carries the pockets into engagement with the pocket closing member 47 closing the pockets and holding them in closed position until the pocket passes out of engagement with the member 47, in which position the roots of the plant are within the furrow formed by the furrow opener, the press wheels acting to force the earth upon the roots substantially at the point where it is released by the plant holder.

The plants are held very firmly without danger of crushing, are not likely to be displaced by the wind, and are freely discharged.

Referring to Figs. 9 and 10, there is illustrated a modification wherein the inner ends of the flexible supports 48 are arranged through spaced openings 51 in the flanges 38 and connected to the resilient arms 52 formed integral with the holder members and secured to the disk 34 by the screws 53. The outer ends of the supports 48 are connected to the disk at 54.

In the modification illustrated by Fig. 11, the outer end of the support 48 is connected to the succeeding flange 38 by means of a tension spring 55, the inner portion 56 of the support being arranged under the preceding flange 38.

I have illustrated and described my improvements in an embodiment which I have found very practical. I have not attempted to illustrate or describe other embodiments or adaptations as it is believed this disclosure will enable those skilled in the art to embody or adapt my improvements as may be desired.

Having thus described my invention what I claim as new and desire to secure by Letters Patent is:

1. A transplanter comprising a rotatably mounted disk-like carrier having peripheral V-shaped recesses and laterally disposed flanges at the front edges of the recesses constituting plant holder guards, plant holders comprising U-shaped holder members formed of rod spring having one arm longer than the other and secured at its inner end to the carrier so that the loop ends of the holder members project across the recesses at the rear of and adjacent to said flanges, tubular pocket members of fabric sleeved upon the bight ends of said holder members and provided with packings of springy material disposed in the pocket members to provide them with transversely curved faces, the free arms of the holder members being disposed to yieldingly support the pocket members at an angle to the plane of the carrier, channel-shaped binding clamped upon the rear edges of said pocket members securing them to said holder members and constituting wear members, flexible support members secured to the front portions of said holder members and to the rear edges of said recesses in opposed coacting relation to said pocket members, and a member mounted at the side of the carrier adapted to successively close said pockets as the carrier revolves.

2. A transplanter comprising a rotatably mounted disk-like carrier having peripheral V shaped recesses and laterally disposed flanges at the front edges of the recesses constituting plant holder guards, plant holders comprising U shaped holder members formed of rod spring having one arm longer than the other and secured at its inner end to the carrier so that the loop ends of the holder members project across the recesses at the rear of and adjacent to said flanges, tubular pocket members of fabric sleeved upon the bight ends of said holder members and provided with packings of springy material disposed in the pocket members to provide them with transversely curved faces, the free arms of the holder members being disposed to yieldingly support the pocket members at an angle to the plane of the carrier, and flexible support members secured to the front portions of said holder members and to the rear edges of said recesses in opposed coacting relation to said pocket members.

3. A transplanter comprising a rotatably mounted disk-like carrier having peripheral V shaped recesses and laterally disposed flanges at the front edges of the recesses constituting plant holder guards, plant holders comprising U-shaped holder members formed of rod spring having one arm longer than the other and secured at its inner end to the carrier so that the loop ends of the holder members project across the recesses at the rear of and adjacent to said flanges, pocket members of flexible material sleeved upon the bight ends of said holder members, the free arms of the holder members being disposed to yieldingly support the pocket members at an angle to the plane of the carrier, channel-shaped binding clamped upon the rear edges of said pocket members securing them to said holder members and constituting wear members, flexible support members secured to the front portions of said holder members and to the rear edges of said recesses in opposed coacting relation to said pocket members, and a member mounted at the side of the carrier adapted to successively close said pockets as the carrier revolves.

4. A transplanter comprising a rotatably mounted disk-like carrier having peripheral V-shaped recesses and laterally disposed flanges at the front edges of the recesses constituting holder guards, plant holders comprising U shaped holder members formed of rod spring having one arm longer than the other and secured at its inner end to the carrier so that the loop ends of the holder members project across the recesses at the rear of and adjacent to said flanges, pocket members of flexible material sleeved upon the bight ends of said holder members, the free arms of the holder members being disposed to yieldingly support the pocket members at an angle to the plane of the carrier, and flexible support members secured to the front portions of said holder members and to the rear edges of said recesses in opposed coacting relation to said pocket members.

5. A transplanter comprising a rotatably mounted disk-like carried, resilient U-shaped pocket holder members secured by one arm to said carrier, flexible tubular pocket members sleeved upon the loop ends of said pocket holder members and provided with packings, the free arms of the holder members being offset to yieldingly hold the pocket members in open position, wear members on the rear edges of said pocket members, flexible support members secured at their front ends to the front portions of said pocket holders and at their rear ends to said carrier, and a member mounted at the side of the carrier adapted to successively close the pockets as the carrier revolves.

6. A transplanter comprising a rotatably mounted disk-like carrier, resilient U-shaped pocket holder members secured by one arm to said carrier, flexible tubular pocket members sleeved upon the loop ends of said pocket holder members and provided with packings, the free arms of the holder members being offset to yieldingly hold the pocket members in open position, and flexible support members secured at their front ends to the front portions of said pocket holders and at their rear ends to said carrier.

7. A transplanter comprising a rotatably mounted disk-like carrier, resilient U shaped pocket holder members secured by one arm to said carrier, pocket members mounted on the loop ends of said pocket holder members, the free arms of the holder members being offset to yieldingly hold the pocket members in open position, wear members on the rear edges of said pocket members, flexible support members secured at their front ends to the front portions of said pocket holders and at their rear ends to said carrier, and a member mounted at the side of the carrier adapted to successively close the pockets as the carrier revolves.

8. A transplanter comprising a rotatably mounted disk-like carrier, resilient U shaped pocket holder members secured by one arm to said carrier, pocket members mounted on the loop ends of said pocket holder members, the free arms of the holder members being offset to yieldingly hold the pocket members in open position, and flexible support members secured at their front ends to the front portions of said pocket holders and at their rear ends to said carrier.

9. A transplanter comprising a carrier provided with recesses, resilient pocket holders mounted on said carrier to extend across the recesses, plant holder guards on said carrier at the front of said recesses, pocket members mounted on said holders and having transversely curved faces, said resilient holders acting to hold said pocket members yieldingly at an angle to the carrier and adapted to torsionally yield to permit closing thereof, flexible support members arranged around the front edges of said pocket members and secured on their rear sides adjacent the front edges, the rear ends of said support members being secured to said carriers at the rear of said pocket members, and a relatively fixed member adapted to successively engage said pocket members as the carrier revolves for closing them, said pocket members having wear members coacting with said pocket closing member.

10. A transplanter comprising a carrier provided with recesses, resilient pocket holders mounted on said carrier to extend across the recesses, pocket members mounted on said holders and having transversely curved faces, said resilient holders acting to hold said pocket members yieldingly at an angle to the carrier and adapted to torsionally yield to permit closing thereof, flexible support members arranged around the front edges of said pocket members and secured on their rear sides adjacent the front edges, the rear ends of said support members being secured to said carriers at the rear of said pocket members.

11. A transplanter comprising a carrier, resilient pocket holders mounted on said carrier, pocket members mounted on said holders and having transversely curved yielding faces, said resilient holders acting to hold said pocket members yieldingly at an angle to the carrier and adapted to torsionally yield to permit closing thereof, flexible support members secured at their rear ends to said carrier and to the front edges of said pocket members to coact therewith, and a relatively fixed member adapted to successively engage said pockets as the carrier revolves for closing them, said pockets having wear members coacting with said pocket closing member.

12. A transplanter comprising a carrier, resilient pocket holders mounted on said carrier, pocket members mounted on said holders and having transversely curved yielding faces, said resilient holders acting to hold said pocket members yieldingly at an angle to the carrier and adapted to torsionally yield to permit closing thereof, and flexible support members secured at their rear ends to said carrier and to the front edges of said pocket members to coact therewith.

13. A transplanter comprising a rotatably mounted disk-like carrier having peripheral recesses, U-shaped spring pocket holder members secured by one arm to said carrier to project across the recesses, said holder members terminating in pocket supporting frames, pocket members sleeved upon said frames, the frames being arranged to yieldingly support the pocket members in open position, and flexible support members connected at their front ends to said pocket holders and at their rear ends to said carrier whereby they are supported in said recesses in opposed coacting relation to said pocket members.

14. A transplanter comprising a rotatably mounted disk-like carrier having peripheral recesses, U-shaped spring pocket holder members secured by one arm to said carrier to project across the recesses, said holder members terminating in pocket supporting frames, pocket members sleeved upon said frames, the frames being arranged to yieldingly support the pocket members in open position, and flexible support members supported in said recesses in opposed plant carrying coacting relation to said pocket members.

15. A transplanter comprising a rotatably mounted disk-like carrier having peripheral recesses, spring pocket holder members secured to said carrier to project across the recesses, said holder members terminating in pocket supporting frames, pocket members on said frames, the frames being arranged to yieldingly support the pocket members in open position, and flexible support members connected at their front ends to said pocket holders and at their rear ends to said carrier whereby they are supported in opposed coacting relation to said pocket members.

16. A transplanter comprising a rotatably mounted disk-like carrier having peripheral recesses, spring pocket holder members secured to said carrier to project across the recesses, said holder members terminating in pocket supporting frames, pocket members on said frames, the frames being arranged to yieldingly support the pocket members in open position, and flexible support members supported in opposed plant carrying coacting relation to said pocket members.

17. A transplanter comprising a carrier having a recess, a resilient U-shaped pocket holder member secured by one arm to said carrier so that the loop end thereof projects across the recess, a flexible tubular pocket member sleeved upon the loop end of said pocket holder member and provided with a packing springy material disposed therein to provide a curved face, the free arm of the holder member being offset to yieldingly hold the pocket member in open position, and a flexible support member secured at its front end to the front portion of said pocket holder and at its rear end to said carrier in opposed relation to said pocket member.

18. A transplanter comprising a carrier having a recess, a resilient U shaped pocket holder member of wire secured by one arm to said carrier so that the loop end thereof projects across the recess, and a flexible tubular pocket member sleeved upon the loop end of said pocket holder member and provided with a packing of springy material, the free arm of the holder member being offset to yieldingly hold the pocket member in open position.

19. A transplanter comprising a carrier having a recess, a resilient U shaped pocket holder member secured by one arm to said carrier so that the loop end thereof projects across the recess, a pocket member, the free arm of the holder member being offset to yieldingly hold the pocket member in open position, and a flexible support member secured at its front end to the front portion of said pocket holder and at its rear end to said carrier in opposed relation to said pocket member.

20. A transplanter comprising a carrier having a recess, a resilient U shaped pocket holder member of wire secured by one arm to said carrier so that the loop end thereof projects across the recess, and a pocket member, the free arm of the holder member being offset to yieldingly hold the pocket member in open position.

GEORGE W. SCHUTMAAT.